(12) United States Patent
Willems

(10) Patent No.: US 6,775,988 B2
(45) Date of Patent: Aug. 17, 2004

(54) COMBUSTION TURBINE HAVING INLET AIR FLOW TEMPERATURE SENSOR AND RELATED METHODS

(75) Inventor: Daniel E. Willems, Oviedo, FL (US)

(73) Assignee: Siemens Westinghouse Power Corproation, Orlando, FL (US)

(*) Notice: Subject to any disclaimer, the term of this patent is extended or adjusted under 35 U.S.C. 154(b) by 47 days.

(21) Appl. No.: 10/244,066

(22) Filed: Sep. 13, 2002

(65) Prior Publication Data

US 2004/0050068 A1 Mar. 18, 2004

(51) Int. Cl.[7] .................................. F02C 3/30
(52) U.S. Cl. .................. 60/775; 60/39.53; 60/728
(58) Field of Search ............... 60/775, 39.53, 60/728; 374/144, 208, 135; 136/218, 231

(56) References Cited

U.S. PATENT DOCUMENTS

| | | | | |
|---|---|---|---|---|
| 3,075,387 A | * | 1/1963 | Rademacher | 136/231 |
| 3,085,125 A | * | 4/1963 | Hill | 136/231 |
| 3,527,620 A | * | 9/1970 | Meador | 136/231 |
| 3,940,988 A | * | 3/1976 | Reed | 374/148 |
| 5,103,629 A | | 4/1992 | Mumford et al. | 60/39.06 |
| 5,168,699 A | | 12/1992 | McCarty et al. | 60/39.091 |
| 5,191,767 A | * | 3/1993 | Kane et al. | 60/728 |
| 5,252,860 A | | 10/1993 | McCarty et al. | 290/40 |
| 5,353,585 A | * | 10/1994 | Munk | 60/775 |
| 5,537,813 A | * | 7/1996 | Davis et al. | 60/775 |
| RE35,674 E | * | 12/1997 | Pustell | 136/231 |
| 5,930,990 A | | 8/1999 | Zachary et al. | 60/39.53 |
| 5,979,220 A | | 11/1999 | Zombo et al. | 73/23.2 |
| 6,173,564 B1 | | 1/2001 | Zachary | 60/39.091 |
| 6,174,160 B1 | | 1/2001 | Lee et al. | 431/11 |
| 6,260,350 B1 | * | 7/2001 | Horii et al. | 60/39.3 |
| 6,312,154 B1 | | 11/2001 | Schick et al. | 374/36 |
| 6,364,602 B1 | | 4/2002 | Andrew et al. | 415/1 |

FOREIGN PATENT DOCUMENTS

EP 1118857 A1 7/2001

* cited by examiner

*Primary Examiner*—Ted Kim

(57) ABSTRACT

An inlet air flow temperature sensor 28 includes a hollow body 32 connected in fluid communication with an inlet air flow 25 a temperature sensing device 34 carried by the hollow body. The hollow body 32 includes interior portions that define a tortuous path of air flow P. The tortuous path of air flow 49 reduces water accumulation on the temperature sensing device 34. The inlet air flow temperature sensor 28 may be used to sense temperature of an inlet air flow 25 associated with an evaporatively cooled combustion turbine 24 that has a combustion turbine air inlet 30 to receive the inlet air flow 25. The evaporatively cooled combustion turbine may, in turn, be used to drive an electrical generator 22.

39 Claims, 3 Drawing Sheets

COMBUSTION TURBINE HAVING INLET AIR FLOW TEMPERATURE SENSOR AND RELATED METHODS

FIELD OF THE INVENTION

The present invention relates to the field of temperature sensing, and, more particularly, to temperature sensing for combustion turbine power generators.

BACKGROUND OF THE INVENTION

An electrical power generator converts mechanical energy into electrical energy. A typical electrical power generator includes a stator and a rotor that rotates within the stator to thereby generate electricity. The rotor, in turn, is mounted to a shaft that drives the rotor. Various mechanical devices may be used to drive the shaft, such as a combustion turbine.

In a conventional configuration, the combustion turbine comprises a compressor to draw in and compress a gas (usually air), a combustor or heat source that adds energy to the compressed gas, and a turbine to extract power from a resulting heated gas expansion. In an electrical generator, the extracted power is used to drive the shaft, which, as already noted, rotates the rotor within the stator to thereby generate electricity.

The capacity of the combustion turbine may be increased if air drawn in by the compressor has a lower temperature relative to that which it will attain during combustion to drive the turbine. Accordingly, cooling the ambient air (typically referred to as inlet air) before it is drawn into the combustion turbine can be a cost effective way to increase the capacity of the combustion turbine. One approach to cooling the inlet air is with a direct refrigeration-cooling system in which ambient air is cooled using conventional refrigeration devices and techniques.

One drawback to refrigeration-cooling is parasitic power loss. This is due to the relatively large power drain needed to power a refrigerator unit. According to some estimates, the parasitic power loss can be as much as thirty percent (30%) of the increased power output of the turbine power generator.

An alternative inlet air cooling technique is provided by an evaporative cooling or fogging system. With such a system, moisture in the form of a water mist or spray is added to the inlet air. As the water evaporates, the temperature of the inlet air (the dry bulb temperature) is lowered to a new temperature (the wet bulb temperature), thereby cooling the inlet air before it is drawn into the compressor of the combustion turbine. An evaporative cooling system tends to be less expensive to install and to operate as compared with other techniques and devices.

Despite the advantages of evaporative cooling, measuring inlet air temperature may be made more difficult by an evaporative cooling system. Air inlet temperature typically has been measured in conventional combustion turbine power generators that lack an evaporative cooling system by using various temperature-sensing devices, including thermistors and thermocouples. As disclosed, for example, in U.S. Pat. No. 5,252,860 to McCartney et al. and U.S. Pat. No. 5,103,629 to Mumford et al., air temperature can be measured using a thermocouple positioned adjacent a compressor air inlet.

Similar such temperature sensing devices have also been employed with combustion turbine power generators that do use evaporative cooling. U.S. Pat. No. 5,930,990 to Zachary et al., for example, discloses an apparatus for adding nebulized water to a gas turbine. The water is added from a spray rack assembly comprising at least one water pipe and at least one corresponding water nozzle. The water is added through a duct that helps direct the water to a compressor inlet. Inlet air temperature is measured with a temperature sensor that, as illustrated, extends into the air flow path to which nebulized water has been added.

A problem associated with conventional temperature sensing devices when used in combustion turbine power generators that use evaporative cooling is that temperature readings may be adversely affected. Specifically, it may be observed that water droplets tend to form on an exposed temperature sensing device when nebulized water is added to the inlet air. When water droplets are carried by the inlet air and deposited on the temperature sensing device, the device may render an inaccurate reading owing to the tendency for the water to evaporate (as when borne by the inlet air) and thereby lower the temperature of the temperature sensing device.

This tendency is especially problematic in combustion turbine power generators using evaporative cooling since the amount of nebulized water that should be added is a function of the temperature of the inlet air. Misreading that temperature can result in an inappropriate amount of water mist being added to the inlet air.

SUMMARY OF THE INVENTION

It is therefore an object of the present invention to provide a device for more accurate, more reliable temperature sensing of the inlet air flow of a combustion turbine, especially one using evaporative cooling.

This and other objects, features, and advantages in accordance with the present invention are provided by an inlet air flow temperature sensor that includes a hollow body connected in fluid communication with an inlet air flow and having interior portions to define a tortuous path of air flow therethrough. A temperature sensing device may be carried by the hollow body. The tortuous path defined by the interior portions of the hollow body may reduce water accumulation on the temperature sensing device. With the inlet air flow temperature sensor, therefore, a more reliable and more accurate reading of a temperature of the inlet air flow may be obtained.

The inlet air flow temperature sensor may advantageously be used with a power generator apparatus that includes an electrical power generator, a combustion turbine, and an evaporative water cooler. The combustion turbine may drive the electrical generator and may have a combustion turbine inlet to receive an inlet air flow. The evaporative water cooler may evaporate water into the inlet air flow to cool the inlet air flow. Accordingly, the inlet air flow temperature sensor may be used to more accurately and reliably read temperatures of the inlet air flow to the combustion turbine.

The interior portions of the hollow body may include a plurality of baffles in spaced-apart relation to thereby define the tortuous path of air flow. The plurality of baffles may be arranged on alternating sides of opposing interior surface portions of the hollow body. For example, the plurality of baffles also may extend inwardly in an interdigitated fashion so that, accordingly, the tortuous path has a serpentine shape.

The hollow body may comprise a tube having an inlet at a first end and an outlet at a medial portion. Additionally, the plurality of baffles may be between the inlet and the outlet. The temperature sensing device may be mounted at a second end of the tube. The tube may have an arcuate first end so that the tube has a J-shape. The inlet of the tube may also be larger than the outlet.

Various types of temperature sensing devices may be carried by the hollow body. For example, the temperature sensing device may be a resistance temperature detector.

An additional aspect of the invention relates to method for sensing inlet air flow temperature for an evaporatively cooled combustion turbine. The method may include connecting a hollow body of an inlet air flow temperature sensor in fluid communication with the inlet air flow, the hollow body carrying a temperature sensing device. The method also may include generating a tortuous path of air flow through an interior of the hollow body to reduce water accumulation on the temperature sensing device, and reading a signal from the temperature sensing device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
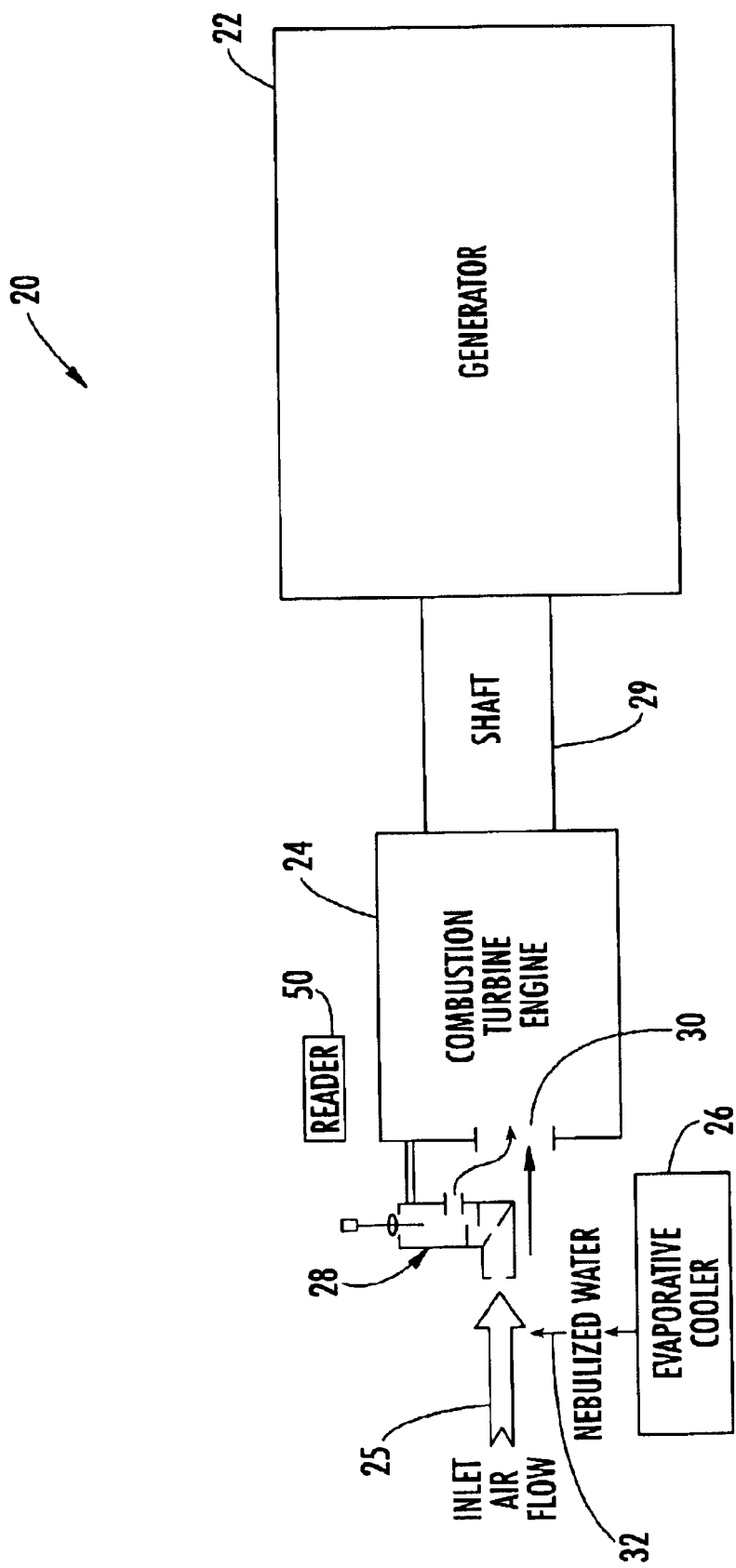
FIG. 1 is a schematic diagram of a power generating apparatus including an inlet air flow temperature sensor according to the invention.

Referring to FIG. 1, a power generating apparatus 20 including an inlet air flow temperature sensor 28 in accordance with the invention is now described. The power generating apparatus 20 illustratively includes an electrical generator 22, a combustion turbine 24 for driving the electrical generator, an evaporative water cooler 26 for cooling inlet air received by the combustion turbine, and the inlet air flow temperature sensor 28.

The combustion turbine 24, more particularly, may include a compressor for receiving and compressing an inlet air flow 25 comprising ambient air, a combustor for adding fuel to the received inlet air and igniting the mixture, and a turbine that is powered by the expansion of heated gases resulting from combustion of the ignited mixture. Powered by the expansion of heated gases, the turbine, drives a shaft 29 connected to the generator 22, as will be readily understood by those skilled in the art.

The electrical generator 22 may include a stator and, within the stator, a rotor driven by the shaft 29. As will also be readily understood by those skilled in the art, the turning of the rotor within the stator generates electrical power.

The combustion turbine 24 illustratively includes a combustion turbine air inlet 30 through which the inlet air flow 25 is received. The capacity of the combustion turbine 24 may be increased by lowering the temperature of the inlet air flow 25. Accordingly, the power generating apparatus 20 also illustratively includes the evaporative water cooler 26, which evaporates water 32 into the inlet air flow 25 to thereby cool the inlet air flow. As will be readily understood by those skilled in the art, water for evaporative cooling of the inlet air flow 25 may be added to the inlet air flow, for example, in nebulized form as a water spray or mist.

The inlet air flow temperature sensor 28 is illustratively adjacent the combustion turbine air inlet 30. The inlet air flow temperature sensor 28 provides a temperature reading of the inlet air flow 25 to which water has been added by the evaporative cooler 26.

Figure 2:
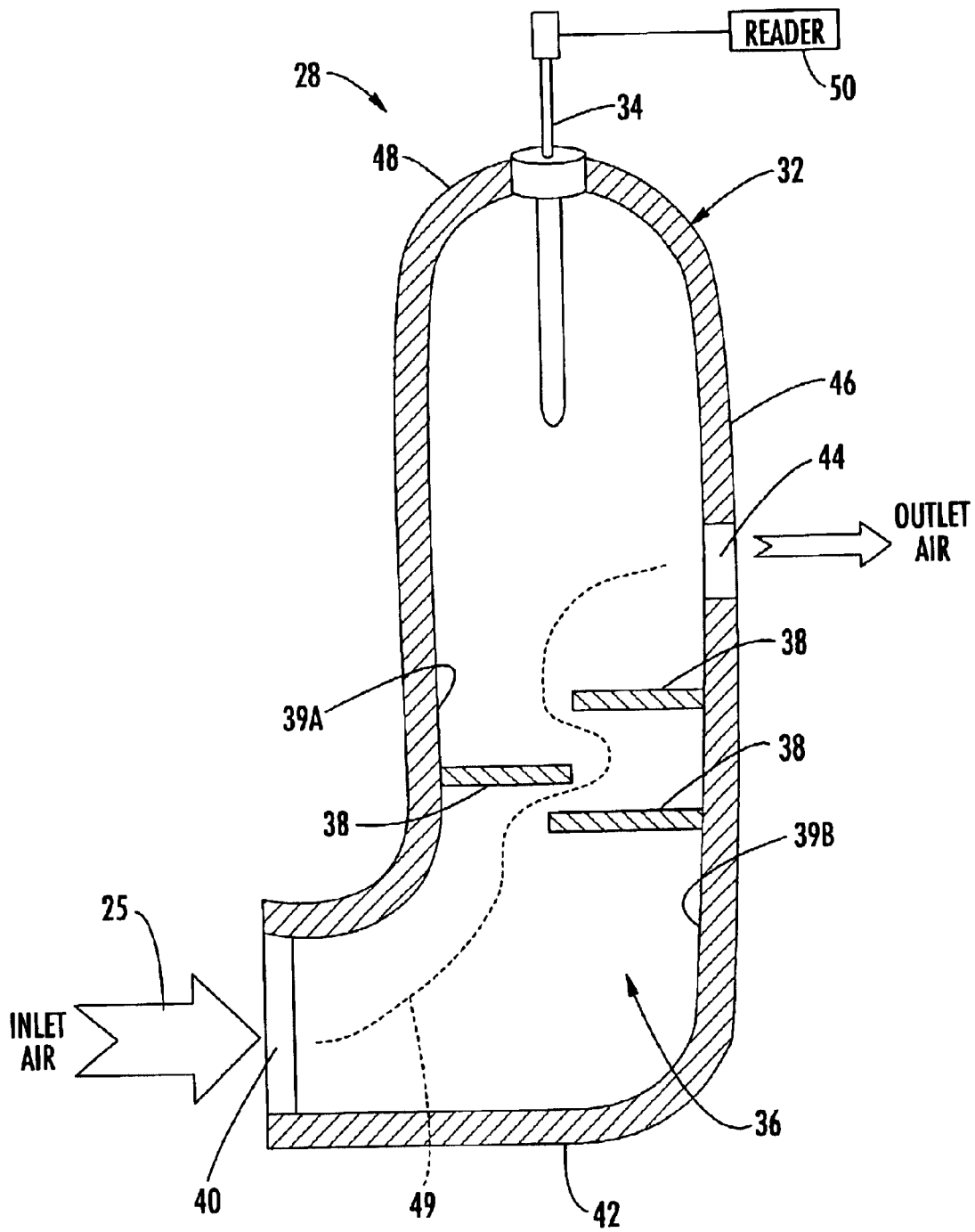
FIG. 2 is a cross-sectional view of the inlet air flow temperature sensor of the power generating apparatus in FIG. 1

Referring additionally to FIG. 2, the inlet air flow temperature sensor 28 illustratively includes a hollow body 32. The hollow body 32 is illustratively connected in fluid communication with the inlet air flow 25. A temperature sensing device 34 is carried by the hollow body 32 for sensing a temperature of the inlet air flow 25.

Interior portions 36 of the hollow body 32 illustratively define a tortuous path 49 of air flow through the hollow body. The tortuous path 49 reduces water accumulation on the temperature sensing device 34.

The tortuous path 49 of air flow is illustratively defined by a plurality of baffles 38. As shown, the baffles 38 are within the interior portions 36 of the hollow body 32. The baffles 38 illustratively are in a spaced-apart relation with respect to one another.

More particularly, the plurality of baffles 38 are illustratively arranged on alternating sides of opposing interior surface portions 39A, 39B of the hollow body 32. So arranged, the plurality of baffles 38 extend inwardly in an interdigitated fashion so that at least a portion of the tortuous path 49 has a serpentine shape as shown. As will be readily understood by those skilled in the art, smaller water droplets can be carried by the air flow and pass through an outlet 44, but larger ones are captured by the baffles 38 and drain out at the bottom of the hollow body 32 or re-evaporate.

The hollow body 32 illustratively comprises a tube having an inlet 40 at a first end 42 of the tube and the outlet 44 at a medial portion 46 of the tube. Illustratively, the plurality of baffles 38 are between the inlet 40 and the outlet 44.

Although the tortuous path 49 of air flow is illustratively defined by the plurality of baffles 38, it will be apparent to those skilled in the art that a tortuous path alternately may be defined, for example, by other types of air deflectors and/or different shapes of the hollow body 32. For example, the shape of the hollow body 32 may comprise a plurality of bends or folds that similarly define a tortuous path within the interior portions 36 of the hollow body.

The temperature sensing 34 device is illustratively mounted at a second or upper end 48 of the tube. The first end of the tube 42 is illustratively arcuate. Accordingly, the tube has a generally J-shape as shown. Other shapes, however, will be readily appreciated by those skilled in the art.

The inlet 40 in the hollow body 32 is illustratively larger than the outlet 44. The relative ratio of the inlet 40 and the outlet 44 is believed to promote the flow of air through the hollow body 32 at a rate that facilitates the sensing of the temperature of the air by the temperature sensing device 34.

The temperature sensing device 34 illustratively includes an end that extends into the path of air that flows within the hollow body 32. Accordingly, with water removed from the air as it flows along the tortuous path 49, as described above, the temperature sensed by the temperature sensing device 34 more accurately reflects the temperature of the inlet air flow 25.

Advantageously, the sensed temperature corresponds correctly to a dry bulb temperature by virtue of the air having been submitted to the tortuous path 49 within the hollow body 32. The tortuous path 49, moreover, reduces the velocity of the air to thereby further improve temperature sensing by the temperature sensing device 34.

Illustratively, the temperature sensing device 34 comprises a resistance temperature detector. Other temperature sensing devices may also serve to sense a temperature of the air within the hollow body 32. For example, a thermocouple or thermistor may alternately be used for temperature sensing, as will be readily appreciated by those skilled in the art.

A reader 50 is illustratively connected to the temperature sensing device 34 for providing a conveniently read indication of the temperature sensed. As will be readily understood by those skilled in the art, the reader 50 may for example be a simple meter or a more complex circuit, including that of a processing circuit either specifically dedicated for temperature reading or part of a general-purpose programmable computer. Moreover, as will also be appreciated by those skilled in the art, the reader 50 can be positioned away from both the hollow body 32 and the temperature sensing device 34 carried by the hollow body 32 so that it is easily accessible for monitoring temperatures of the inlet air flow 25 received by the combustion turbine 24.

Figure 3:
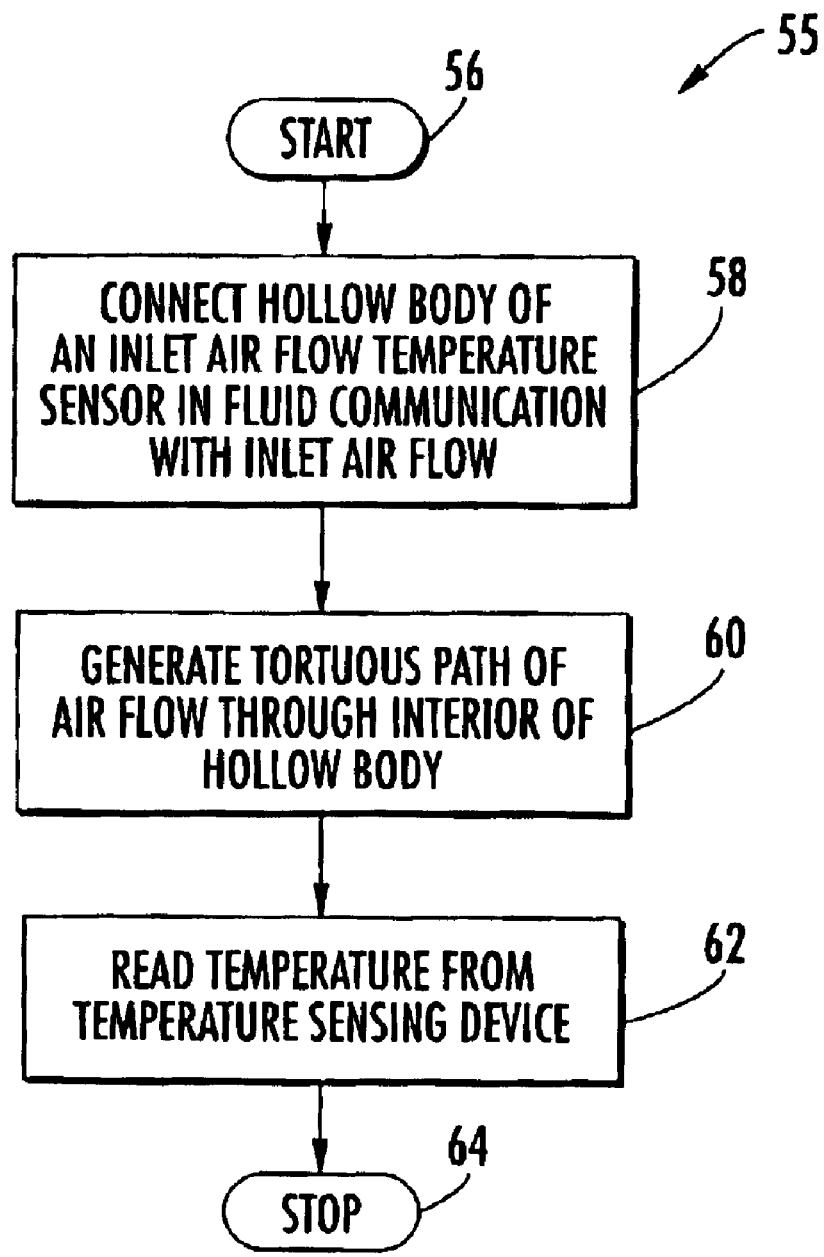
FIG. 3 is a flow diagram of a method for sensing inlet air flow temperature according to the invention.

An additional aspect of the invention relates to a method for sensing inlet air flow temperature for an evaporatively cooled device such as a combustion turbine 24. As illustrated by the flow diagram 55 of FIG. 3, the method illustratively includes, after the start (Block 56), connecting a hollow body 32 of an inlet air flow temperature sensor 28 in fluid communication with an inlet air flow 25 (Block 58).

At Block 60, the method further includes generating a tortuous path 49 of air flow through an interior of the hollow body 32 so that water accumulation on a temperature sensing device 34 carried by the hollow body 32 is reduced. Thus, the temperature sensing device 34 is able to render a more accurate reading of the inlet air flow temperature. The temperature is read at Block 62, prior to the stop (Block 64).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

What is claimed is:

1. A power generating apparatus comprising:
   an electrical generator;
   a combustion turbine for driving said electrical generator and having a combustion turbine air inlet for receiving an inlet air flow;
   an evaporative water cooler for evaporating water into the inlet air flow to cool the inlet air flow; and
   an inlet air flow temperature sensor between said evaporative cooler and the combustion turbine air inlet, said inlet air flow temperature sensor comprising
      a unitary hollow body connected in fluid communication with the inlet air flow to intercept a portion of the inlet air flow,
      a temperature sensing device carried by said unitary hollow body, and
      said unitary hollow body comprising interior portions defining a tortuous path of air flow therethrough to reduce water accumulation on said temperature sensing device.

2. A power generating apparatus according to claim 1 wherein the interior portions of said unitary hollow body defining the tortuous path of air flow comprise a plurality of baffles in spaced-apart relation.

3. A power generating apparatus according to claim 2 wherein said plurality of baffles are arranged on alternating sides of opposing interior surface portions.

4. A power generating apparatus according to claim 3 wherein said plurality of baffles extend inwardly in an interdigitated fashion so that the tortuous path has a serpentine shape.

5. A power generating apparatus according to claim 2 wherein said unitary hollow body comprises a tube having an inlet at a first end and an outlet at a medial portion; and wherein said plurality of baffles are between the inlet and outlet.

6. A power generating apparatus according to claim 5 wherein said temperature sensing device is mounted at a second end of the tube.

7. A power generating apparatus according to claim 5 wherein the tube has an arcuate first end so that the tube has a J-shape.

8. A power generating apparatus according to claim 5 wherein the outlet is larger than the inlet.

9. A power generating apparatus according to claim 1 wherein said temperature sensing device comprises a resistance temperature detector.

10. An inlet air flow temperature sensor for an evaporatively cooled combustion turbine having a combustion turbine air inlet for receiving an inlet air flow, the inlet air flow temperature sensor comprising:
    a unitary hollow body to be connected in fluid communication with the inlet air flow to intercept a portion of the inlet air flow,
    a temperature sensing device carried by said unitary hollow body; and
    said unitary hollow body comprising interior portions defining a tortuous path of air flow therethrough to reduce water accumulation on said temperature sensing device.

11. An inlet air flow temperature sensor according to claim 10 wherein the interior portions of said unitary hollow body defining the tortuous path of air flow comprise a plurality of baffles in spaced-apart relation.

12. An inlet air flow temperature sensor according to claim 11 wherein said plurality of baffles are arranged on alternating sides of opposing interior surface portions.

13. An inlet air flow temperature sensor according to claim 12 wherein said plurality of baffles extend inwardly in an interdigitated fashion so that the tortuous path has a serpentine shape.

14. An inlet air flow temperature sensor according to claim 11 wherein said unitary hollow body comprises a tube having an inlet at a first end and an outlet at a medial portion; and wherein said plurality of baffles are between the inlet and outlet.

15. An inlet air flow temperature sensor according to claim 14 wherein said temperature sensing device is mounted at a second end of the tube.

16. An inlet air flow temperature sensor according to claim 14 wherein the tube has an arcuate first end so that the tube has a J-shape.

17. An inlet air flow temperature sensor according to claim 14 wherein the outlet is larger than the inlet.

18. An inlet air flow temperature sensor according to claim 10 wherein said temperature sensing device comprises a resistance temperature detector.

19. A method for sensing inlet air flow temperature for an evaporatively cooled combustion turbine comprising:

connecting a unitary hollow body of an inlet air flow temperature sensor in fluid communication with the inlet air flow to intercept a portion of the inlet air flow, the inlet air flow temperature sensor comprising a temperature sensing device carried by the unitary hollow body; and generating a tortuous path of air flow through an interior of the unitary hollow body to reduce water accumulation on the temperature sensing device while reading a signal from the temperature sensing device.

20. A method according to claim 19 wherein generating the tortuous path of air flow comprises providing a plurality of baffles in spaced-apart relation in the interior of the unitary hollow body.

21. A method according to claim 20 wherein the plurality of baffles are arranged on alternating sides of opposing interior surface portions.

22. A method according to claim 21 wherein the plurality of baffles extend inwardly in an interdigitated fashion so that the tortuous path has a serpentine shape.

23. A method according to claim 21 wherein the unitary hollow body comprises a tube having an inlet at a first end and an outlet at a medial portion; and wherein the plurality of baffles are between the inlet and outlet.

24. A method according to claim 23 wherein the temperature sensing device is mounted at a second end of the tube.

25. A method according to claim 23 wherein the tube has an arcuate first end so that the tube has a J-shape.

26. A method according to claim 23 wherein the outlet is larger than the inlet.

27. An inlet air flow temperature sensor for an evaporatively cooled combustion turbine having a combustion turbine air inlet for receiving an inlet air flow, the inlet air flow temperature sensor comprising:

a hollow body to be connected in fluid communication with the inlet air flow and comprising a tube having an inlet at a first end and an outlet at a medial portion;

a temperature sensing device carried by said hollow body; and said hollow body comprising a plurality of baffles in spaced-apart relation between the inlet and outlet to define a tortuous path of air flow to reduce water accumulation on said temperature sensing device.

28. An inlet air flow temperature sensor according to claim 27 wherein said plurality of baffles are arranged on alternating sides of opposing interior surface portions of said hollow body.

29. An inlet air flow temperature sensor according to claim 27 wherein said plurality of baffles extend inwardly in an interdigitated fashion so that the tortuous path has a serpentine shape.

30. An inlet air flow temperature sensor according to claim 27 wherein said temperature sensing device is mounted at a second end of the tube.

31. An inlet air flow temperature sensor according to claim 27 wherein the tube has an arcuate first end so that the tube has a J-shape.

32. An inlet air flow temperature sensor according to claim 27 wherein the outlet is larger than the inlet.

33. An inlet air flow temperature sensor according to claim 27 wherein said temperature sensing device comprises a resistance temperature detector.

34. An inlet air flow temperature sensor for an evaporatively cooled combustion turbine having a combustion turbine air inlet for receiving an inlet air flow, the inlet air flow temperature sensor comprising:

a tubular hollow body to be connected in fluid communication with the inlet air flow to intercept a portion of the inlet air flow;

a temperature sensing device carried by said tubular hollow body; and said tubular hollow body comprising interior portions defining a tortuous path of air flow therethrough to reduce water accumulation on said temperature sensing device.

35. An inlet air flow temperature sensor according to claim 34 wherein the interior portions of said tubular hollow body defining the tortuous path of air flow comprise a plurality of baffles in spaced-apart relation.

36. An inlet air flow temperature sensor according to claim 35 wherein said plurality of baffles are arranged on alternating sides of opposing interior surface portions.

37. An inlet air flow temperature sensor according to claim 36 wherein said plurality of baffles extend inwardly in an interdigitated fashion so that the tortuous path has a serpentine shape.

38. An inlet air flow temperature sensor according to claim 35 wherein said tubular hollow body has an inlet at a first end and an outlet at a medial portion; and wherein said plurality of baffles are between the inlet and outlet.

39. An inlet air flow temperature sensor according to claim 38 wherein said temperature sensing device is mounted at a second end of said tubular hollow body.

\* \* \* \* \*